US008774382B2

(12) United States Patent
Bingaman et al.

(10) Patent No.: US 8,774,382 B2
(45) Date of Patent: Jul. 8, 2014

(54) ONLINE REPORTING TOOL FOR CONFERENCING CUSTOMERS

(75) Inventors: Anne K. Bingaman, Washington, DC (US); Dagny Boyd Evans, Alexandria, VA (US); Boban Mathew, Arlington, VA (US); Kesah N. Schmitt, Washington, DC (US); Alina K. Scott, Alexandria, VA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 411 days.

(21) Appl. No.: 13/174,761

(22) Filed: Jun. 30, 2011

(65) Prior Publication Data

US 2011/0261936 A1     Oct. 27, 2011

Related U.S. Application Data

(62) Division of application No. 11/518,127, filed on Sep. 11, 2006, now Pat. No. 8,340,266.

(60) Provisional application No. 60/716,092, filed on Sep. 13, 2005.

(51) Int. Cl.
    *H04M 3/42* (2006.01)
(52) U.S. Cl.
    USPC ................................. 379/202.01; 379/204.01
(58) Field of Classification Search
    USPC .................. 379/120, 114, 119, 112, 144, 202
    See application file for complete search history.

(56) References Cited

U.S. PATENT DOCUMENTS

| 4,481,383 | A | 11/1984 | Madon |
| 4,796,293 | A | 1/1989 | Blinken et al. |
| 5,099,510 | A | 3/1992 | Blinken, Jr. et al. |
| 5,287,270 | A | 2/1994 | Hardy et al. |
| 5,483,587 | A | 1/1996 | Hogan et al. |
| 5,506,893 | A | 4/1996 | Buscher et al. |
| 5,631,904 | A | 5/1997 | Fitser et al. |
| 5,701,340 | A | 12/1997 | Zwick |
| 5,719,928 | A | 2/1998 | Pinnell et al. |

(Continued)

FOREIGN PATENT DOCUMENTS

WO          WO 98/23075          5/1998

OTHER PUBLICATIONS

A Professional Conference Call, http://aprocall.com/billing.aspx, printed May 21, 2003 (2 pages).

(Continued)

*Primary Examiner* — Amal Zenati
(74) *Attorney, Agent, or Firm* — Finnegan, Henderson, Farabow, Garrett & Dunner, LLP

(57) ABSTRACT

Embodiments consistent with the present invention provide an integrated system for conferencing services reporting to support customer billing needs. Systems consistent with the present invention enable a customer to retrieve and use integrated usage data, including data for unbilled conferencing services. Furthermore, systems consistent with the present invention provide an integrated account management interface to enable a customer to retrieve and use account information in real time and to manage a conferencing services account with ease. Still further, systems consistent with the present invention enable a customer to establish multiple levels of security to easily manage multiple users with multiple information needs and responsibilities. Systems consistent with the present invention also provide tools to analyze and track moderator conferencing schedules to enhance accurate timekeeping and billing.

5 Claims, 20 Drawing Sheets

(56) References Cited

U.S. PATENT DOCUMENTS

| | | | |
|---|---|---|---|
| 5,818,836 A | 10/1998 | DuVal | |
| 5,828,743 A | 10/1998 | Pinnell et al. | |
| 5,842,174 A | 11/1998 | Yanor | |
| 5,844,973 A | 12/1998 | Venkatraman et al. | |
| 5,867,494 A | 2/1999 | Krishnaswamy et al. | |
| 5,884,284 A | 3/1999 | Peters et al. | |
| 5,903,629 A | 5/1999 | Campbell, IV et al. | |
| 5,943,406 A * | 8/1999 | Leta et al. | 379/120 |
| 5,960,069 A | 9/1999 | Felger | |
| 5,960,416 A | 9/1999 | Block | |
| 5,987,633 A | 11/1999 | Newman et al. | |
| 6,023,499 A | 2/2000 | Mansey et al. | |
| 6,049,778 A | 4/2000 | Walker et al. | |
| 6,128,601 A | 10/2000 | Van Horne et al. | |
| 6,134,564 A | 10/2000 | Listou | |
| 6,141,404 A | 10/2000 | Westerlage et al. | |
| 6,243,711 B1 | 6/2001 | Wu et al. | |
| 6,377,939 B1 | 4/2002 | Young | |
| 6,385,644 B1 | 5/2002 | Devine et al. | |
| 6,427,008 B1 | 7/2002 | Balaz | |
| 6,515,968 B1 | 2/2003 | Combar et al. | |
| 6,553,108 B1 | 4/2003 | Felger | |
| 6,556,659 B1 | 4/2003 | Bowman-Amuah | |
| 6,574,622 B1 | 6/2003 | Miyauchi et al. | |
| 6,925,160 B1 | 8/2005 | Stevens et al. | |
| 6,941,134 B2 * | 9/2005 | White | 455/418 |
| 7,082,439 B1 | 7/2006 | Hickman et al. | |
| 7,103,644 B1 | 9/2006 | Zhang et al. | |
| 7,151,824 B1 | 12/2006 | Bingaman et al. | |
| 7,471,781 B2 | 12/2008 | Bingaman et al. | |
| 7,796,744 B1 | 9/2010 | Bingaman et al. | |
| 2001/0002927 A1 | 6/2001 | Detampel, Jr. et al. | |
| 2001/0012346 A1 | 8/2001 | Terry | |
| 2002/0025028 A1 | 2/2002 | Manto | |
| 2002/0026394 A1 | 2/2002 | Savage et al. | |
| 2002/0138828 A1 | 9/2002 | Robohm et al. | |
| 2002/0143872 A1 * | 10/2002 | Weiss et al. | 709/204 |
| 2002/0161667 A1 | 10/2002 | Felkey et al. | |
| 2003/0023523 A1 | 1/2003 | McKibben et al. | |
| 2003/0023582 A1 | 1/2003 | Bates et al. | |
| 2003/0072428 A1 | 4/2003 | Stern et al. | |
| 2004/0073500 A1 | 4/2004 | Owen, Jr. | |
| 2004/0170260 A1 | 9/2004 | Baker | |
| 2006/0233334 A1 | 10/2006 | Bingaman et al. | |
| 2007/0124258 A1 | 5/2007 | Bingaman et al. | |
| 2009/0129572 A1 | 5/2009 | Bingaman et al. | |

OTHER PUBLICATIONS

CustomCall Data Systems, http://www.customcall.com/index.html, printed May 21, 2003 (1 page).

* cited by examiner

Moderator Report

| Company | Last Name | First Name | User ID | Moderator Passcode | Participant Passcode | Toll Free Dial In | International Dial In | Add Date | Employee Code | Permanent Billing Code |
|---|---|---|---|---|---|---|---|---|---|---|
| Soundpath | Yeung | Chun | 1533 255 | 895 790 0468 6 | 895 790 0468 | 1-354-586-6914 | 1-521-955-0536 | 6/29/2005 | | |
| Soundpath | Evans | Dagny | 263 547 | 305 463 0228 7 | 305 463 0228 | 1-284-289-0835 | 1-521-785-5400 | 9/15/2004 | 1159 | |
| Soundpath | Evans | Dagny | 263 547 | 305 293 1159 9 | 305 293 1159 | 1-354-586-6914 | 1-521-955-0536 | 7/14/2003 | 1159 | |
| Soundpath | Marsan | Cory | 292 149 | 895 222 1111 9 | 895 222 1111 | 1-354-586-6914 | 1-521-955-0536 | ######## | 2211 | |
| Soundpath | Scott | Alina K. | 3106 695 | 305 293 1270 4 | 305 293 1270 | 1-354-586-6914 | 1-521-955-0536 | 5/26/2005 | 1270 | |
| Soundpath | Fuchs | Natalie | 374 874 | 305 222 5656 7 | 305 222 5656 | 1-354-586-6914 | 1-521-955-0536 | 2/7/2005 | 1276 | |
| Soundpath | Fuchs | Natalie | 374 874 | 9748751 | 974875 | 1-284-852-5501 | 1-521-884-8856 | 9/1/2004 | 1276 | |
| Soundpath | Fuchs | Natalie | 374 874 | 305 293 0496 | 305 293 0496 | 1-354-586-6914 | 1-521-955-0536 | 9/28/2004 | 1276 | |
| Soundpath | Mellinger | Celia | 3773 069 | 305 293 0206 0 | 305 293 0206 | 1-354-586-6914 | 1-521-955-0536 | 2/25/2005 | 206 | |
| Soundpath | Mellinger | Celia | 3773 069 | 305 293 2503 | 305 293 2503 | 1-354-586-6914 | 1-521-955-0536 | 8/3/2005 | 206 | |
| Soundpath | Robertson | Terri Lynn | 385 374 | 305 293 2850 5 | 305 293 2850 | 1-354-586-6914 | 1-521-955-0536 | 5/25/2004 | 2850 | |
| Soundpath | Bingaman | Anne | 418 654 | 305 421 6191 6 | 305 421 6191 | 1-354-586-6914 | 1-521-955-0536 | 7/28/2003 | 5028 | |
| Soundpath | Mascarella | Erin | 459 128 | 289 520 0635 1 | 289 520 0635 | 1-354-586-6914 | 1-521-955-0536 | 1/24/2005 | 2252 | |
| Soundpath | Miller | Shelby | 5111 617 | 584 256 4209 8 | 584 256 4209 | 1-354-586-6914 | 1-521-955-0536 | 5/2/2005 | 4209 | |
| Soundpath | Holt | Angelina | 640 424 | 305 293 0849 1 | 305 293 0849 | 1-354-586-6914 | 1-521-955-0536 | ######## | 849 | |
| Soundpath | Marsan | Cory | 675 354 | 895 663 1310 2 | 895 663 1310 | 1-354-586-6914 | 1-521-955-0536 | 7/28/2003 | 2211 | |
| Soundpath | Schmitt | Kesah | 5215 819 | 305 293 2855 8 | 305 293 2855 | 1-354-586-6914 | 1-521-955-0536 | 2/24/2005 | 2855 | |
| Soundpath | Mathew | Bob | 810 588 | 305 686 1872 5 | 305 686 1872 | 1-284-852-5501 | 1-521-884-8856 | 1/18/2005 | 1828 | |
| Soundpath | Mathew | Bob | 810 588 | 305 293 1828 7 | 305 293 1828 | 1-354-586-6914 | 1-521-955-0536 | ######## | 1828 | |
| Soundpath | Mathew | Bob | 810 588 | 895 528 0969 4 | 895 528 0969 | 1-354-586-6914 | 1-521-955-0536 | ######## | 1828 | |
| Soundpath | Kirstein | Lacey | 846 470 | 895 447 7100 9 | 895 447 7100 | 1-354-586-6914 | 1-521-955-0536 | 2/20/2004 | 1312 | |

Unbilled Usage Report

Soundpath,Dedicated Internal Use

Unbilled usage information is preliminary and is to be used solely for purposes of *estimating* conference call charges. It includes estimated charges for reservationless conferencing only and may be incomplete. Only charges in actual invoices sent by Soundpath should be considered accurate and complete charges for purposes of payment. All times are shown in Central Time.

| View Call Details | Description | Moderator Name | Office Code | Employee Code | Call Date | Call Start | Participants | Minutes | Est Pre Tax | Est Taxes | Est Total Charges | Billing Code |
|---|---|---|---|---|---|---|---|---|---|---|---|---|
| Call Details | Conferencing Services | Celia Mellinger | SDIU | 0206 | 07/07/2005 | 05:29 PM | 3 | 38 | $9.12 | $0.00 | $9.12 | 3773069-4445 |
| Call Details | Conferencing Services | Celia Mellinger | SDIU | 0206 | 07/07/2005 | 05:14 PM | 3 | 26 | $6.24 | $0.00 | $6.24 | 1234-0206 |
| Call Details | Conferencing Services | Anne Bingaman | SDIU | 5028 | 07/07/2005 | 01:58 PM | 8 | 484 | $116.16 | $0.00 | $116.16 | 321-789 |
| Call Details | Conferencing Services | Natalie Fuchs | SDIU | 1276 | 07/07/2005 | 12:17 PM | 2 | 12 | $2.88 | $0.00 | $2.88 | |
| Call Details | Conferencing Services | Cory Marsan | SDIU | 2211 | 07/07/2005 | 09:56 AM | 5 | 217 | $52.08 | $0.00 | $52.08 | 9-9 |
| Call Details | Conferencing Services | Natalie Fuchs | SDIU | 1276 | 06/30/2005 | 02:00 PM | 1 | 2 | $0.48 | $0.00 | $0.48 | |
| Call Details | Conferencing Services | Natalie Fuchs | SDIU | 1276 | 06/30/2005 | 01:34 PM | 1 | 2 | $0.48 | $0.00 | $0.48 | 555-99 |
| Call Details | Conferencing Services | Natalie Fuchs | SDIU | 1276 | 06/30/2005 | 01:27 PM | 1 | 2 | $0.48 | $0.00 | $0.48 | 555-777 |
| Call Details | Conferencing Services | Cory Marsan | SDIU | 2211 | 06/30/2005 | 01:24 PM | 1 | 3 | $0.72 | $0.00 | $0.72 | 555-999 |
| Call Details | Conferencing Services | Dan Asher | SDIU | 1343 | 06/29/2005 | 04:05 PM | 3 | 33 | $7.92 | $0.00 | $7.92 | 9-9 |
| Call Details | Conferencing Services | Chun Yeung | SDIU | | 06/29/2005 | 12:18 PM | 1 | 9 | $2.16 | $0.00 | $2.16 | |
| Call Details | Conferencing Services | Celia Mellinger | SDIU | 0206 | 06/29/2005 | 10:41 AM | 1 | 3 | $0.72 | $0.00 | $0.72 | General |
| Call Details | Conferencing Services | Shelby Miller | SDIU | 4209 | 06/29/2005 | 10:29 AM | 2 | 32 | $7.68 | $0.00 | $7.68 | |
| Call Details | Conferencing Services | Celia Mellinger | SDIU | 0206 | 06/29/2005 | 08:17 AM | 3 | 55 | $13.20 | $0.00 | $13.20 | 77.88 |
| | | | | | | | 2 | 12 | $2.88 | $0.00 | $2.88 | |

FIGURE 14

Unbilled Usage Call Details

Soundpath Dedicated Internal Use

Unbilled usage information is preliminary and is to be used solely for purposes of estimating conference call charges. It includes estimated charges for reservationless conferencing only and may be incomplete. Only charges in actual invoices sent by Soundpath should be considered accurate and complete charges for purposes of payment. All times are shown in Central Time.

| Phone # | Moderator Name | Office Code | Employee Code | Date | Call Start | Call End | Participants | Minutes | Est Pre Tax | Est Tax | Est Total Charges | Billing Code | Unique Conf Id |
|---|---|---|---|---|---|---|---|---|---|---|---|---|---|
| 2022931159 | Bob Mathew | SDIU | 1828 | 07/15/2005 | 06:30 PM | 06:33 PM | 1 | 3 | $0.72 | $0.00 | $0.72 | 4589-2133 | 27234097 |
| 2022931270 | Bob Mathew | SDIU | 1828 | 07/15/2005 | 06:30 PM | 06:33 PM | 1 | 3 | $0.72 | $0.00 | $0.72 | 4589-2133 | 27234097 |
| 2022931828 | Bob Mathew | SDIU | 1828 | 07/15/2005 | 06:29 PM | 06:34 PM | 1 | 5 | $1.20 | $0.00 | $1.20 | 4589-2133 | 27234097 |
| Summary | Bob Mathew | | | 07/15/2005 | 06:29 PM | 06:34 PM | 3 | 11 | $2.64 | $0.00 | $2.64 | 4589-2133 | 27234097 |

FIGURE 15

ONLINE REPORTING TOOL FOR CONFERENCING CUSTOMERS

RELATED APPLICATIONS

This is a division of application Ser. No. 11/518,127, filed on Sep. 11, 2006, now U.S. Pat. No. 8,340,266 which claims the benefit of the filing date of U.S. Provisional Application No. 60/716,092, filed Sep. 13, 2005, titled "Online Reporting Tool for Conferencing Customers," of Anne K. Bingaman, Dagny Boyd Evans, Boban Mathew, Kesah Schmitt, and Alina Scott, both of which are incorporated in their entirety herein by reference.

FIELD

This disclosure is directed to the field of conferencing services and, more particularly, to billing systems for moderated conferencing services that are chargeable to a client or project.

BACKGROUND

Businesses today rely heavily on conferencing services to enable people to meet without having to be in the same physical location. Audio conferencing, video conferencing, and Web conferencing are all well-known services available to businesses that do business on a regional, national, or global scale. Typically, a business makes a reservation for a conference through a conferencing services provider. The conferencing services provider establishes a "virtual location," e.g., a dial-in phone number or Website address, for the conference participants. After the conference is over, the conferencing services provider bills the business for the cost of the conference.

Conventional conferencing services providers suffer from several drawbacks. For example, if a customer bills reimbursable expenses to its own clients, someone in the customer's financial services department must manually process each conference bill to enable the customer to pass conferencing charges on to its clients. For a customer with hundreds of clients, this not only takes a great deal of time but human mistakes may result in billing one client for another's conferences, resulting in client-relation problems. Even when conferencing services bills are made available to customers electronically, the data provided is typically limited to call-level information such as the number of participants, the overall cost of the conference, etc.

Furthermore, management of conference services involves a number of different people, each requiring different levels of access and information. A telecommunications person may be involved in administering accounts, while the company's financial staff may be involved in processing bills, and an administrator may be designated to oversee the company's dealings with the conferencing services provider. Depending on individual needs and responsibilities, each person may need access to different information. This may be very difficult to manage for a conventional conferencing services provider.

Still further, conference participants frequently participate in several conferences in the same day or week. Often, participants may discuss several different billable matters during a single conference. For participants who bill for their time, such as attorneys or consultants, it becomes difficult to keep track of time and topics of multiple conferences. While a conventional conferencing services provider may provide the conference facility and general information about a conference, there are no tools readily available to assist participants and their companies in accurately and fully capturing time spent on conferences.

Systems and methods consistent with embodiments of the present invention address these and other drawbacks of conventional conferencing services provider systems.

SUMMARY

Methods and systems are disclosed for managing moderators of conferences. A request to create a moderator report is received from a customer via a network, wherein the request includes an identifier for at least one moderator associated with the customer. Account details relating to conferences assigned to the at least one moderator are compiled to create the moderator report, and the moderator report is provided to the customer via the network.

In other embodiments, methods and systems are disclosed for creating an unbilled usage data report for conferencing services. Usage data relating to a conference is received, and the usage data and at least one billing rate associated with a customer are used to calculate unbilled charges for each conference related to the usage data. An estimated tax is calculated for each conference related to the usage data, and the unbilled usage data report is provided to the customer, wherein the unbilled usage data report includes the unbilled charges and the estimated tax.

In other embodiments, methods and systems are disclosed for managing moderator time spent on conferences. A selection for the moderator and a time period are received from a customer via a network. A record of time spent by a moderator on conferences is created, based on each conference associated with the moderator during the time period, and the record is provided to the customer via a network.

Further, in other embodiments, systems and methods are disclosed for online reporting of conferencing services. An account information component tracks information for a customer. A management component manages moderators associated with the customer. A usage reports component generates online reports related to the moderators' usage of conferencing services. A billing reports component provides online reports related to billed charges for conferencing services provided to the customer.

Additional objects and advantages of the invention will be set forth in part in the description which follows, and in part will be obvious from the description, or may be learned by practice of the invention.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 5 is an exemplary moderator report, consistent with embodiments of the present invention;

FIG. 9 is an exemplary user interface for adding accounts using a reporting tool, consistent with embodiments of the present invention;

FIG. 10 is an exemplary user interface for deleting moderators using a reporting tool, consistent with embodiments of the present invention;

FIG. 11 is an exemplary user interface for searching for moderators, consistent with embodiments of the present invention;

FIG. 14 is an exemplary user interface for presenting a report of unbilled usage data, consistent with embodiments of the present invention;

FIG. 15 is an exemplary user interface for presenting unbilled usage call details, consistent with embodiments of the present invention;

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

Figure 1:
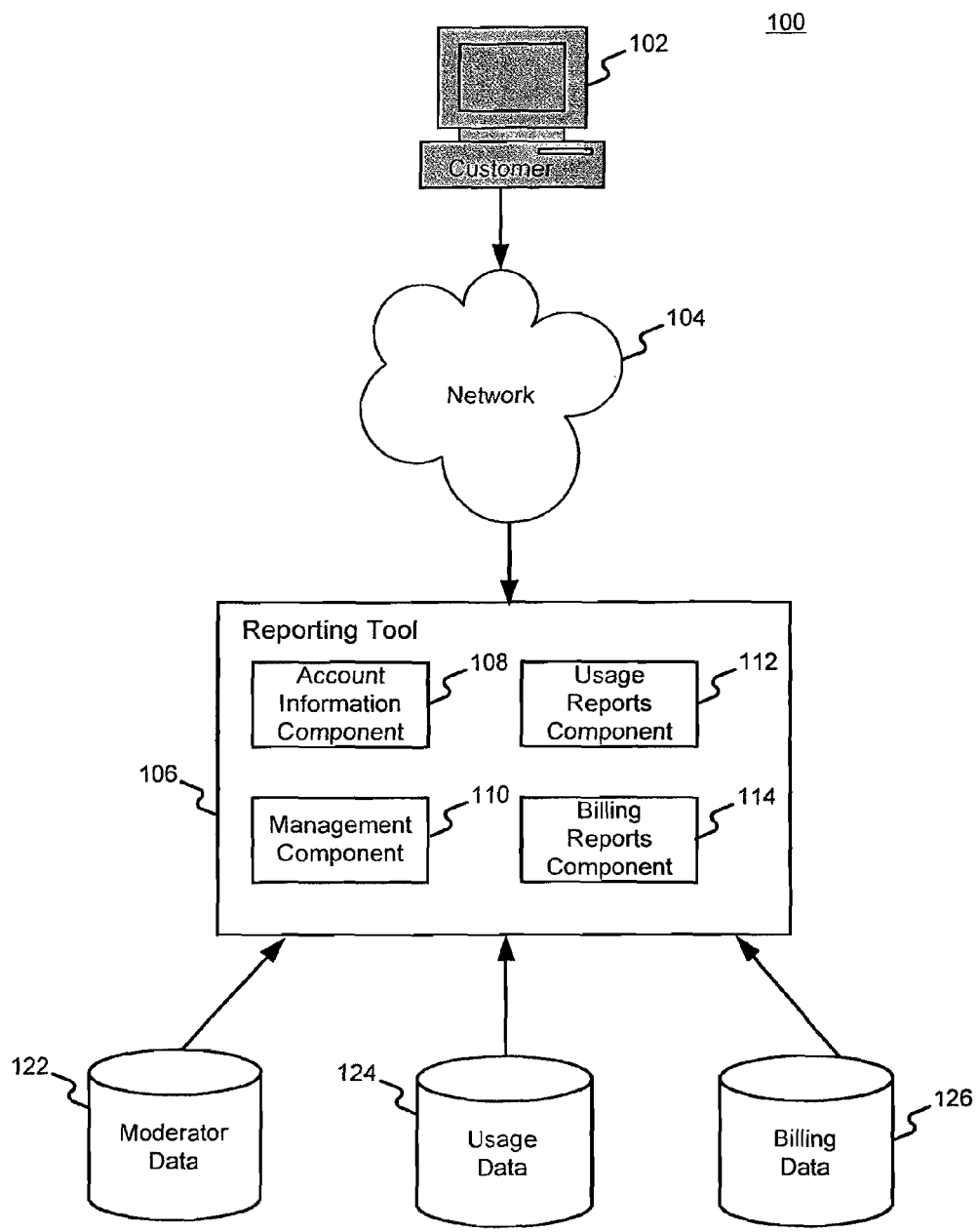
FIG. 1 is a diagram of a reporting system for conferencing customers, consistent with embodiments of the present invention.

FIG. 1 illustrates an exemplary reporting system 100 for conferencing customers consistent with an embodiment of the present invention. As shown in FIG. 1, a customer 102 may connect to reporting tool 106 via a network 104. Customer 102 may include, for example, a user associated with a customer account, such as an employee, moderator, or client, or a user with permission to access reporting tool 106. In certain embodiments, customer 102 may connect to online reporting tool 106 by logging into a website with a unique username and password, as described in more detail below with respect to FIG. 2.

Reporting tool 106 may include an account information component 108, a management component 110, a usage reports component 112, and a billing reports component 114. Reporting tool 106 provides flexible, integrated services to conferencing customers, including, for example, the ability to: 1) view current unbilled and previously billed usage details and charges, 2) download billing files, 3) query historical invoice information, 4) download time management data, 5) access account information, e.g., by searching for a moderator or downloading a moderator report, and 6) submit requests for moderator additions, deletions, and materials or training.

Reporting tool 106 may, in certain embodiments, use a relational database and tools such as JAVA™ to create an interactive and dynamic reporting application that significantly enhances the customer experience. Reporting tool 106 may be implemented on a secure server and made accessible via various login methods, such as, for example, secure usernames and passwords uniquely assigned to each customer 102. In some embodiments, reporting tool 106 may restrict access of certain customers 102 to certain functions. For example, a customer might specify that one of its users should have access to administrative tools (e.g., account information), but not usage data (e.g., billing reports and usage data).

Reporting tool 106 may connect to or include various databases, such as moderator database 122, usage database 124, and billing database 126. Moderator database 122 may store information relating to moderators, such as moderator identification information or moderator histories. Usage database 124 may store information relating to reporting tool 106 usage, such as customer usage data, line-item usage data, call data, or other data. Billing database 126 may store information relating to billing, such as, for example, charges for services, details relating to conferences such as times and lengths of conferences, etc. Access to databases 122, 124, and 126 (if implemented as separate database systems) may be facilitated through a direct communication link, a local area network (LAN), a wide area network (WAN) and/or other suitable connections. Systems and methods of the present invention are not limited to separate databases or even to the use of a database, as data may come from practically any source, such as the Internet, a storage medium such as a disk or flash drive, and other organized collections of data.

Figure 2:
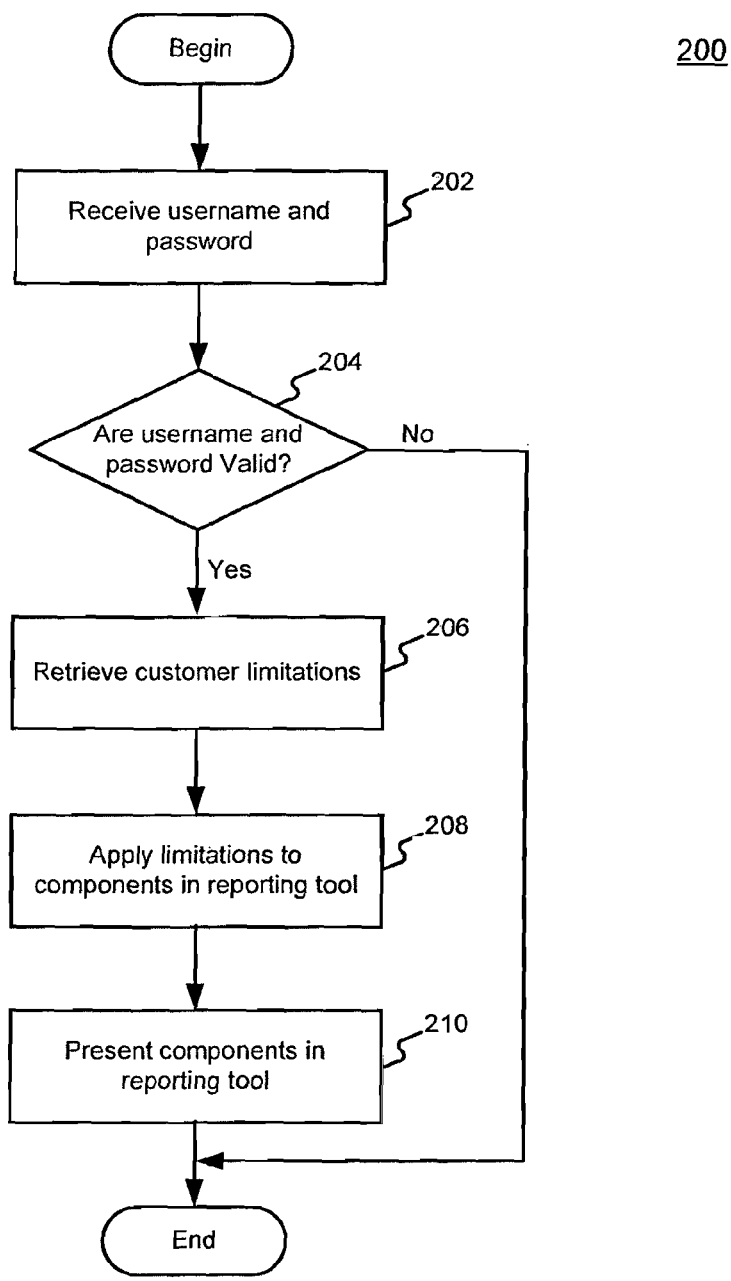
FIG. 2 is a flow diagram of an exemplary process for authenticating a conferencing customer, consistent with embodiments of the present invention.

FIG. 2 illustrates an exemplary process for authenticating customer 102 and allowing customer 102 to access reporting tool 106. In one embodiment, when customer 102 supplies a username and password (step 202), the system may verify that the username and password are valid (step 204). If the username and password are not validated for any reason, (step 204, No), the process ends. If the username and password are validated (step 204, Yes), the system may retrieve customer limitations (step 206). Customer limitations may be, for example, pre-assigned to unique customers, groups of customers, or certain users, and may prevent customer 102 from, for example, viewing certain data, performing certain functions, or accessing certain components in reporting tool 106. Next, any customer limitations are applied to components in reporting tool 106 (step 208). The components that customer 102 may access are presented to the user (step 210). In certain embodiments, all components of the tool are presented to the user. In other embodiments, some customers may only access management component 106 and usage reports component 110, and other users may only access billing reports component 114.

The components of the online reporting tool will now be described in greater detail with reference to the attached drawings. In particular, account information component 108 is described with reference to FIGS. 3-6, management component 110 is described with reference to FIGS. 7-11, usage reports component 112 is described with reference to FIGS. 12-16, and billing reports 114 component is described with reference to FIGS. 17-19.

Account Information Component

Figure 3:
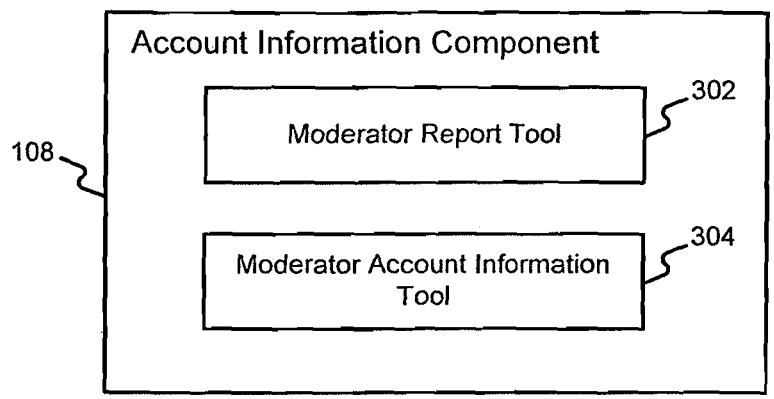
FIG. 3 is a block diagram of an exemplary account information component of a reporting tool, consistent with embodiments of the present invention.

FIG. 3 illustrates an exemplary account information component 108. Account information component 108 allows conferencing customers to retrieve account information for active moderators, e.g., individuals that request or participate in conferences, such as audio conferences. For example, if a law firm is a conferencing customer, then its attorneys are the moderators. Account information for all moderators may be retrieved by searching for an individual moderator, or by downloading a moderator report that contains account information for some or all of the moderators related to a conferencing customer.

As shown in FIG. 3, account information component 108 may include a moderator report tool 302 and a moderator account information tool 304. Moderator report tool 302 allows a customer to download a moderator report. Moderator account information tool 304 allows a user to search for an individual moderator account using search criteria such as, for example, first name, last name, user ID, moderator passcode, or participant passcode.

Moderator Report

Figure 4:
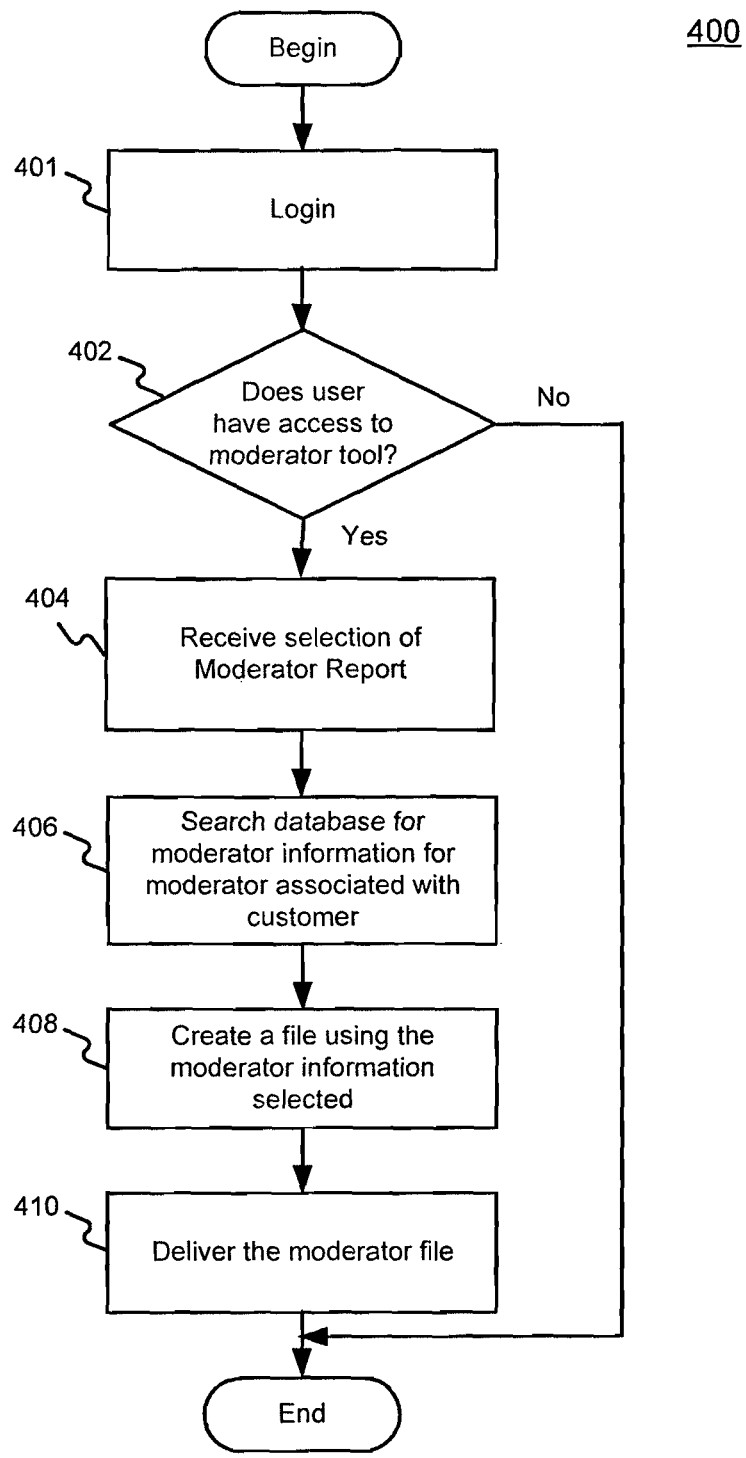
FIG. 4 is a flow diagram of an exemplary process for generating a sample moderator report, consistent with embodiments of the present invention.

FIG. 4 is a flow diagram of an exemplary process 400 for creating a moderator report using moderator report tool 302. As shown in FIG. 4, customer 102 logs in to the system (step 401), for example via known webpage login methods, or using the process described above with respect to FIG. 2. If the user has valid permission to access, modify, and/or create a moderator report (step 402, Yes), for example, as determined by the validation process described above with respect to FIG. 2, moderator report tool 302 may, in certain embodiments, receive a selection for a moderator report from customer 102 (step 404). The moderator report may allow customer 102 to download and view details for active accounts, and which may have been previously established, for example, by account information component 108. The system searches moderator database 122 containing moderator and conference information for moderators associated with the customer (step 406).

Moderator report tool 302 creates a file containing moderator information (step 408), which is delivered to the user (step 410). In one embodiment, moderator report tool 302 may deliver the file to customer 102 as an online report via the Internet. For example, FIG. 5 illustrates an exemplary moderator report, which may be delivered via the Internet. In the embodiment illustrated in FIG. 5, the moderator report may include various data fields, such as company (e.g., customer), last name, first name, user ID, moderator passcode, participant passcode, toll free dial-in number, international dial-in number, date added, employee code, and permanent billing code. Other fields, such as client number and matter number, may also be included in the moderator report to provide account information to conferencing customers. In another embodiment, the file may be delivered to customer 102 as a spreadsheet. In certain embodiments, moderators or users may select which fields to include in the moderator report, and may customize or sort reports, for example by customer, type of conference, or participant.

Moderator Account Information

Figure 6:
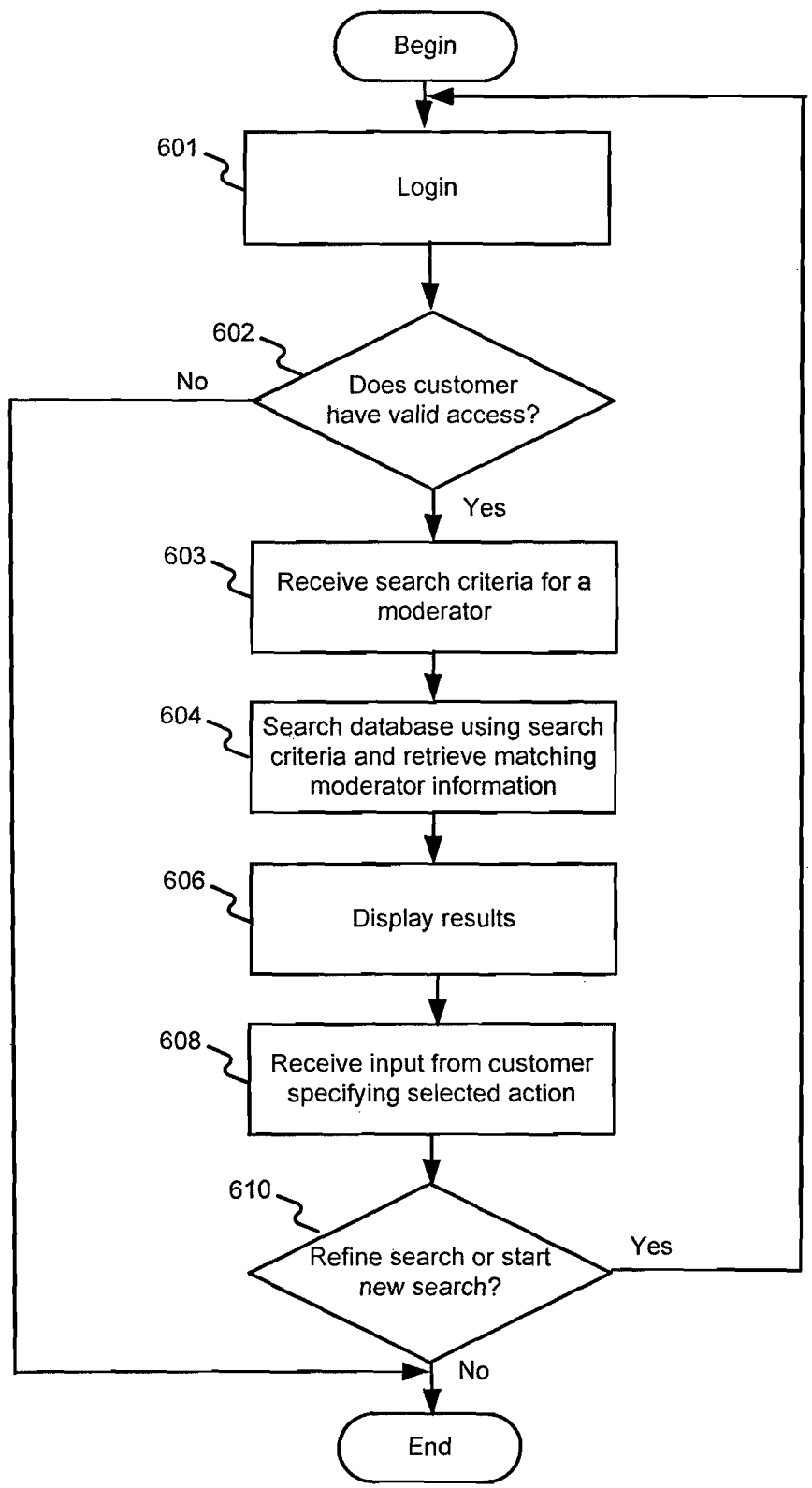
FIG. 6 is a flow diagram of an exemplary process for accessing account information details, consistent with embodiments of the present invention.

FIG. 6 is a flow diagram of an exemplary process for locating account information for a moderator. In certain embodiments, customer 102 may first log into reporting tool 106 (step 601) and have access permissions validated before locating account information, as described above with respect to FIG. 2. If customer 102 has valid access (step 602, Yes), then moderator account information tool 304 receives a selection for search criteria for a moderator (step 603). The search criteria may include, for example, first name, last name, user ID, moderator passcode, participant passcode, and other information. Customers may specify whether search results must include matches for all criteria, some criteria, or any criteria.

After customer 102 enters the search criteria, moderator account information tool 304 searches moderator database 122 for information on moderators related to the criteria (step 604). Reporting tool 106 displays matching results (step 606). Search results for each moderator may include, for example, moderator information, conference information, and conference options. Customer 102 may elect to send the results, including instructions for use, to an address of their choice (e.g., an e-mail address), print the results, or perform other actions. For example, customer 102 may, in certain embodiments, modify the results, request that a moderator be deleted from the system, request materials for the moderator, or view the next moderator who matches the search criteria. Reporting tool 106 receives the user's input for an action (step 608), performs the action, and may send a confirmation to the user that the action was performed, for example after sending or printing the results.

If the user elects to refine the search or start a new search (step 610, Yes), the process may loop back and continue the process. If the user elects not to refine the search or start a new search (step 610, No), the process ends.

Management Component

Figure 7:
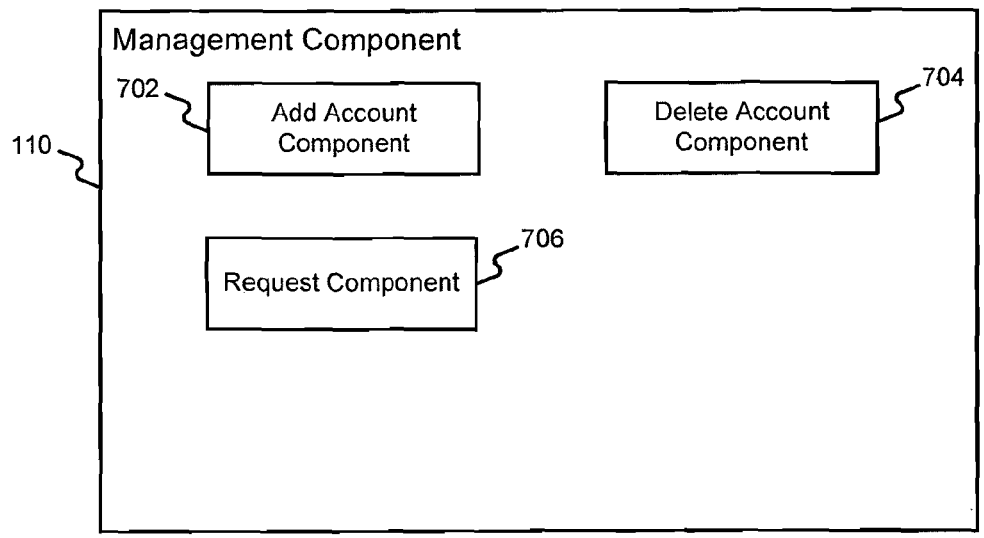
FIG. 7 is a block diagram of an exemplary management component of a reporting tool, consistent with embodiments of the present invention.

FIG. 7 illustrates an exemplary management component 110, which may offer conferencing customers a simple way to add and delete accounts and request materials or training for existing accounts. As shown in FIG. 7, management component 110 may include an add account component 702 to add a customer or user account, a delete account component 704 to delete an account, and a request component 706 to allow a customer to request training and materials for moderators, or request training for any individual.

Figure 8:
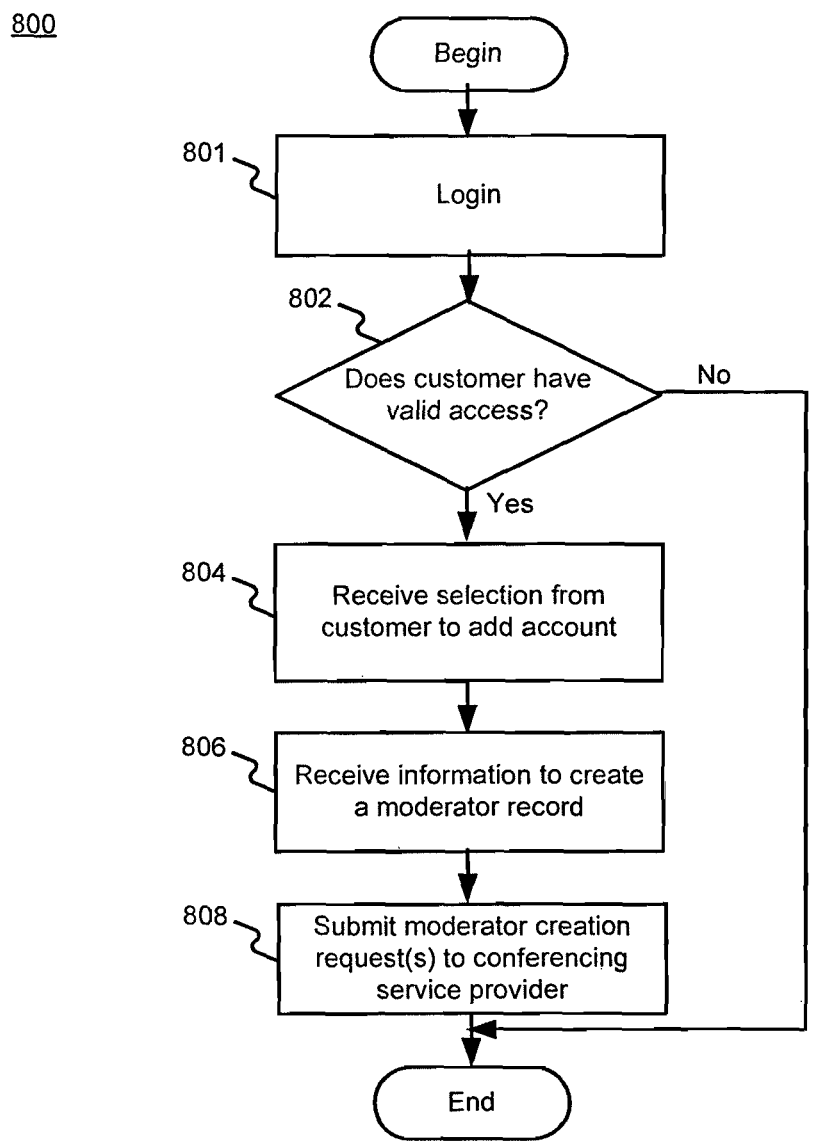
FIG. 8 is a flow diagram of an exemplary process for adding a moderator, consistent with embodiments of the present invention.

FIG. 8 is a flow diagram of an exemplary process for requesting a new moderator account. First, in some embodiments, customer 102 may log onto reporting tool 106 (step 801) as described above with respect to FIG. 2. As shown in FIG. 8, if the user has valid access (step 802, Yes), reporting tool 106 may receive a customer selection to add an account (step 804), for example by selecting "add account" using add account component 702 from a webpage. The system may receive information from customer 102 to create a moderator record for the new account (step 806).

Figure 9:
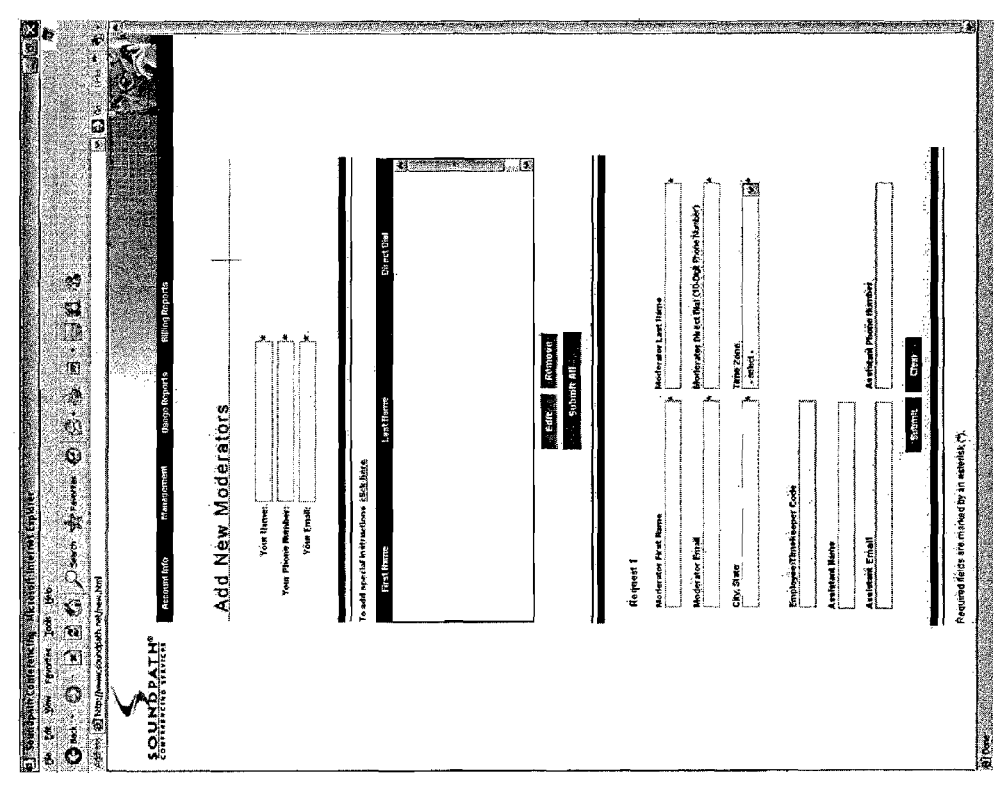

Customer 102 may supply the information, in certain embodiments, via an online form. FIG. 9 illustrates an exemplary user interface for an online form that customer 102 may use to add a new moderator. The online form, as shown in FIG. 9, may contain fields for each piece of information needed to create a new account, such as name, phone number, time zone, employee code, assistant's name, assistant's e-mail address, and assistant's phone number. The online form may also allow the customer to enter information for the employee entering the new account information, such as name, phone number, e-mail address, and any special instructions. Turning back to FIG. 8, once the new account information has been entered, add account component 702 may submit the moderator creation request to a conferencing service provider (step 808).

In certain embodiments, after the online form is submitted with the requested moderator's information, a summary of the submitted information appears in a box at the top of the page or in a pop-up window, for example. The fields in the user interface may then be reset to empty, allowing additional requests to be made. Each time, a moderator's information appears in the box at the top of the page, and from this box, the new requests may be edited, removed, or submitted as a whole. The system may automatically send the submissions to a conferencing services provider for processing. For example, the system may send the submissions to a system-defined destination, such as an e-mail address.

Figure 10:
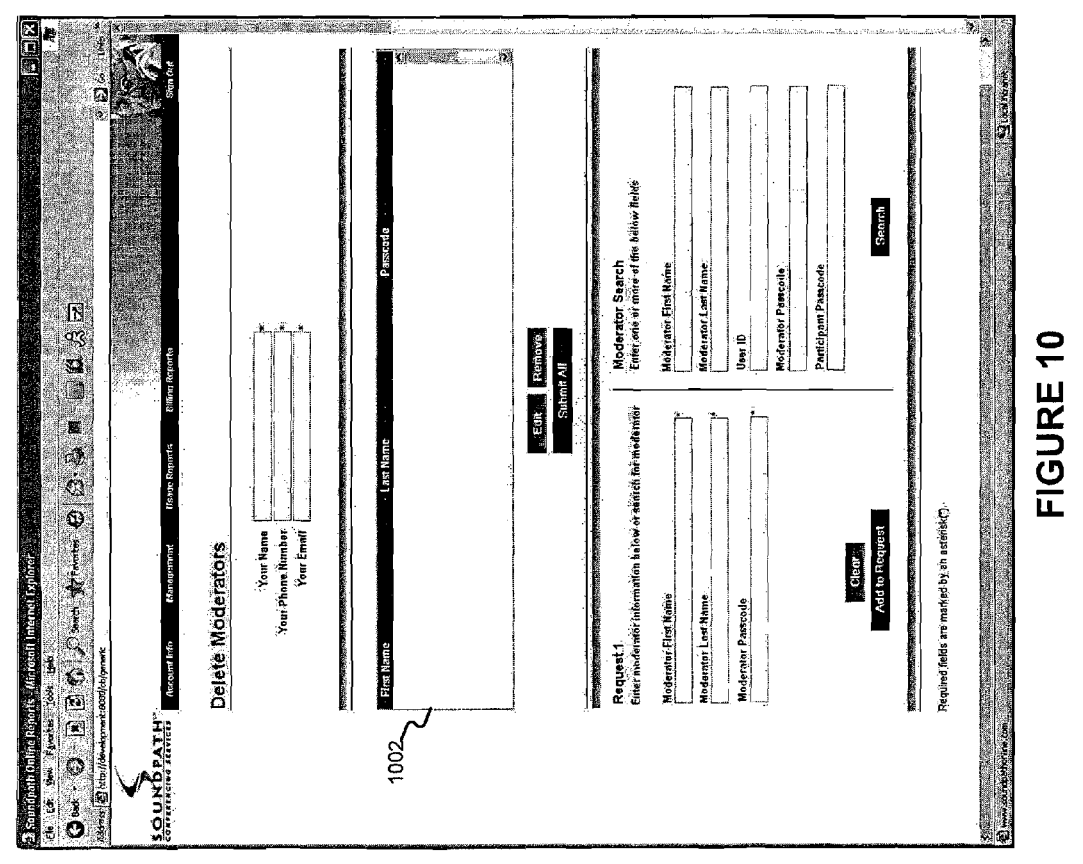
Figure 11:
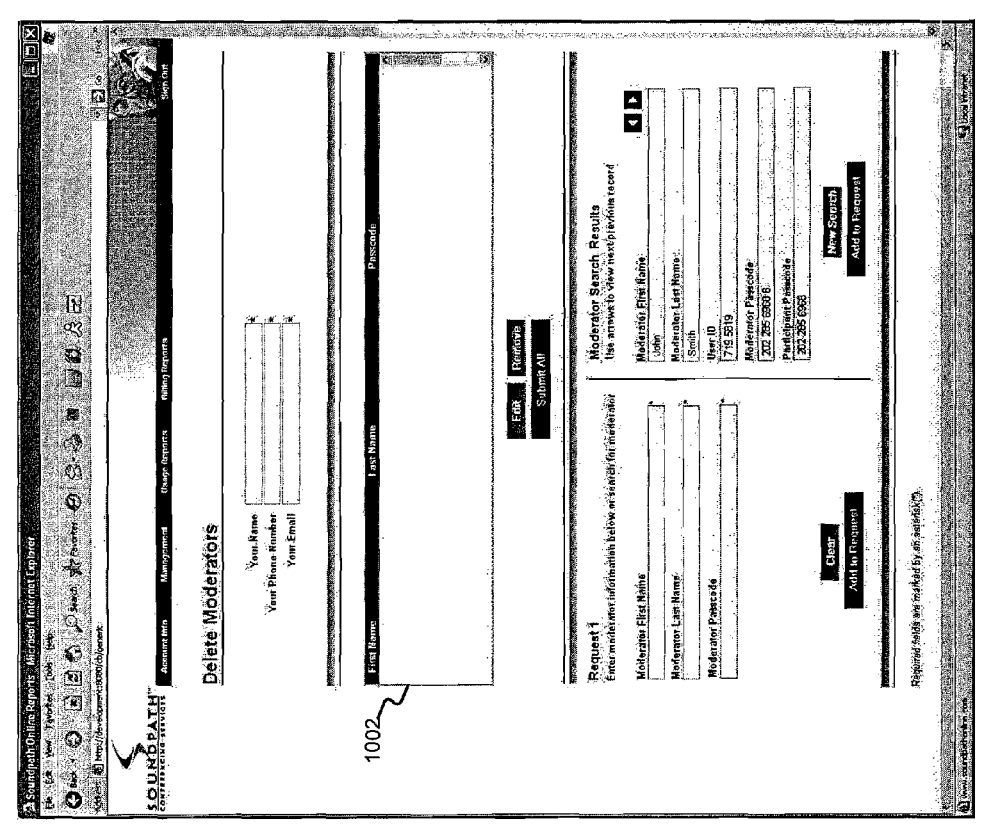

Customer 102 may also delete moderators, using, for example, an online form that allows a customer to submit a request to inactivate one or more accounts corresponding to one or more moderators. FIG. 10 illustrates an exemplary user interface for an online form that customer 102 may use to delete moderators. The form, as shown in FIG. 10, may contain data fields to collect information to identify a moderator for deleting, such as first name, last name, and/or moderator passcode. If the information is unknown, customer 102 may search for the moderator directly using, for example, one or more of the following criteria: first name, last name, user ID, moderator passcode, and participant passcode. FIG. 11 illustrates an exemplary user interface for searching for moderators with sample search criteria. Once the appropriate moderator has been selected, the user may add the moderator to a request module 1002. The user interfaces shown in FIGS. 10-11 may also allow customer 102 to enter information for the user making the request to delete a moderator, such as the user's name, phone number, e-mail address, and any special instructions. As shown in FIG. 10, customer 102 may select moderators for editing, removal from the request, or submission using request component 706.

Training

As discussed above with respect to FIG. 7, request component 706 may allow customer 102 to request training for existing moderators (such as hard copy or electronic training materials). To request such materials, customer 102 may designate a moderator to receive training, or search for a moderator using, for example, the same search method and criteria used in the delete account tool described above with respect to FIGS. 10 and 11. Moderator search options may include: first name, last name, user ID, moderator passcode, participant passcode, etc.

When customer 102 selects a moderator from the search results, the moderator's information may automatically populate the fields on the material request form. Customer 102 may choose from various options to define a request for each moderator, such as request hard copy materials for a moderator or moderator's assistant, request training for a moderator or a moderator's assistant, etc. These options may be presented, for example, using a drop down list or radio buttons. Once moderator information has been entered, either by searching for the information or manually entering the information, and the request has been defined, customer 102 may request the materials. Once submitted, the request may be sent to the conferencing services provider, e.g., by sending it to a system-defined e-mail address, for processing.

In certain embodiments, customers may request training separate from requesting materials. Training requests for materials may be related to a specific moderator account, or training requests may be made for any individual, such as an administrator or secretary. In other embodiments, moderators themselves may request training and/or materials.

Usage Reports Component

As described above, usage reports component 112 may provide customers with access to historical usage data and to unbilled usage data, stored, for example, in usage database 124. Usage data may contain data about moderators' usage of conferencing services, such as summary-level call information as well as billing information and participant-level call details. Usage data may be updated in real-time or on a periodic basis, such as daily, hourly, etc.

Unbilled Usage Data

In certain embodiments, customer 102 may review an unbilled usage report including, for example, unbilled usage data and associated estimated charges for conferencing services. This data may be designated as "unbilled" because it covers usage since the customer's last invoice, for example. In one example, if the last invoice run for a customer occurred, for example, in the bill cycle ending Jan. 14, 2004, all calls through approximately Jan. 12, 2004 may have been billed to the customer. Prior to the next invoice run, e.g., on Feb. 14, 2004, unbilled usage data for that customer would include call records from Jan. 13, 2004 through Feb. 12, 2004 (i.e., the cutoff for conferences to be included in the Feb. 14, 2004 invoice run).

Figure 12:
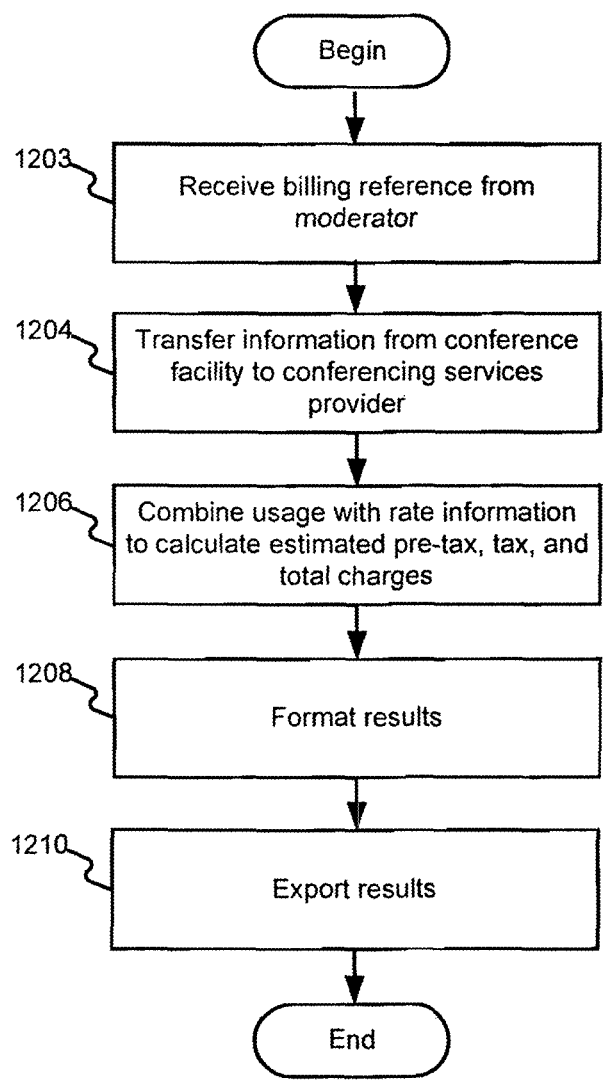
FIG. 12 is a flow diagram of an exemplary process for collecting and processing unbilled usage data, consistent with embodiments of the present invention.

FIG. 12 illustrates an exemplary process for collecting and processing unbilled usage data. As shown in FIG. 12, a moderator enters a client-matter number or other billing reference for a conference (step 1203). The billing reference may be entered, for example, before a conference, during a conference, or after a conference. This billing reference, along with other call detail record data, may be transferred from the conference facility to the conferencing services provider, for example, on a periodic (e.g., daily or hourly) basis (step 1204). The usage information is combined in real-time with customer rate information to estimate pre-tax charges, taxes and total charges (step 1206). The results may be formatted according to customer-specified methods or other specifications (step 1208). After the estimated costs have been calculated and formatted, the formatted usage information may be exported from the conferencing services provider, e.g., using a Microsoft Excel™ file (step 1210). In certain embodiments, the text file may then be uploaded into usage reports component 112 to import the data into a table, and the usage information may be summarized into a summary table. The data may then be searched and displayed using usage reports component 112, as described in more detail below with respect to FIG. 16. Additional details regarding the collection and processing of unbilled usage data may be found in U.S. patent application Ser. No. 10/848,181, entitled Dynamic Reporting Tool for Conferencing Customers.

Figure 13:
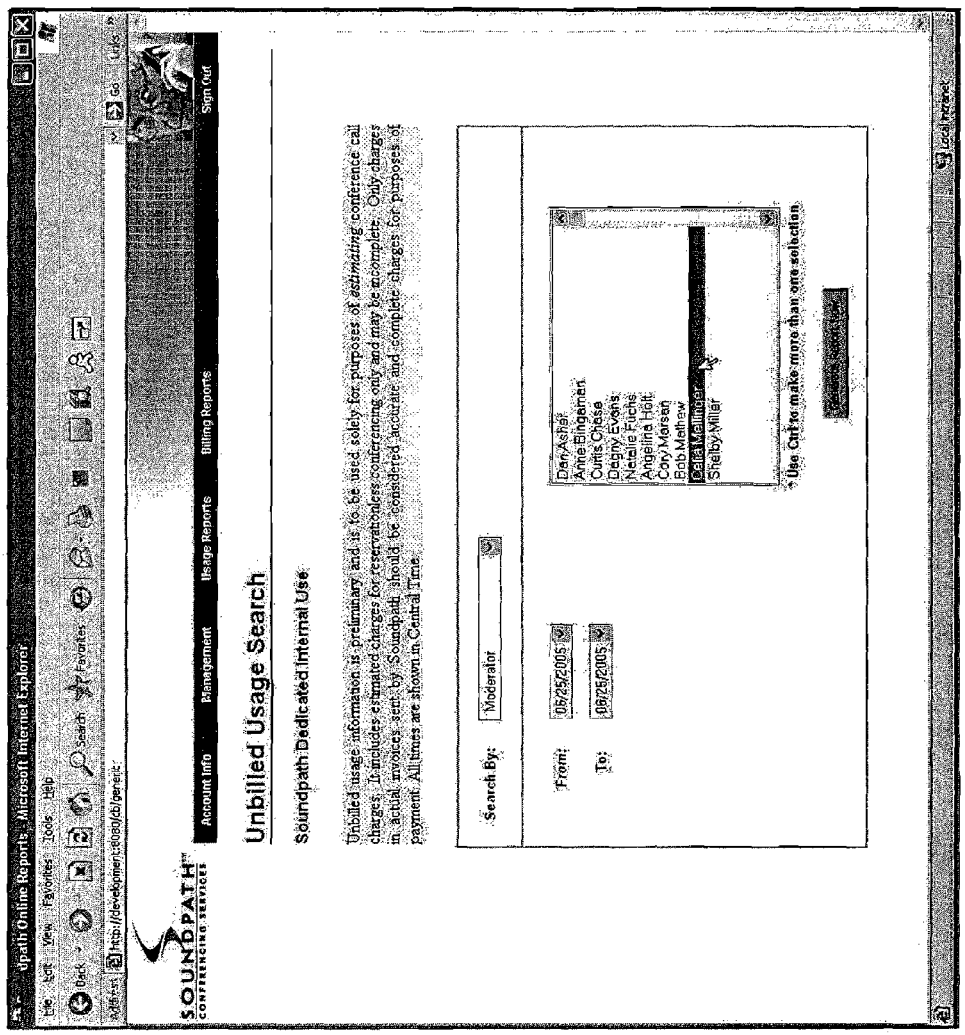
FIG. 13 is an exemplary user interface for searching unbilled usage data, consistent with embodiments of the present invention.

Customer 102 may access unbilled usage data by searching for all unbilled usage data or by using on any of a number of search criteria options, such as office code, moderator, employee code, billing code, etc. FIG. 13 illustrates a exemplary user interface for searching unbilled usage data. As shown in FIG. 13, customer 102 may choose one or more values to search by, such as searching by moderator, for example using the drop down list shown, or using other known methods. For example, if the criterion was moderator, the user may select one or more of the moderators from the list. The user may also choose a date range to limit the search results. In another example, if the search criterion included a billing code, the user may be presented with a list of possible billing codes and may select one or more billing codes to create an unbilled usage report. After searching, the user may view an unbilled usage report.

FIG. 14 illustrates an exemplary user interface for displaying an unbilled usage report. Data in the report may include, for example, details of each call (e.g., moderator name, time of call, office code, employee code, call date, call start, number of participants, minutes, and billing code) as well as billing information (e.g., estimated pre-tax charges, estimated taxes, and estimated total charges). One skilled in the art will recognize that the unbilled usage report may be displayed via the Internet or other network, downloaded as an Excel spreadsheet, printed from a browser window or other display, e-mailed to an inputted address, or accessed via other means and methods. Participant-level details for each call may be available from the Unbilled Usage Report by, for example, selecting a "Call Details" button or link next to each call.

FIG. 15 illustrates an exemplary user interface displaying an unbilled usage call details report. The report unbilled usage call details may display participant-level data, as shown in FIG. 15, such as a phone number, moderator name, office code, employee code, date, call start time, call end time, number of participants, number of minutes, estimated pre-tax charges, estimated taxes, estimated total charges, billing code, conference ID, etc. One skilled in the art will recognize that the unbilled usage call details report may be displayed via the Internet or other network, downloaded as an Excel spreadsheet, printed from a browser window or other display, e-mailed to an inputted address, or accessed via other means and methods.

Customers may use participant-level data, for example, to determine exactly how much time each participant spent in a conference. For example, a court reporter service may bill each call participant separately for a conference call, and the court reporter may access participant-level data to accurately determine the charges for each call participant. In another example, required continuing education credit may be given to participants in a conference, such as a web or video conference, and the accrediting body may use participant-level data to ensure that the participants earn proper credits based on the time they spent in the conference.

Figure 16:
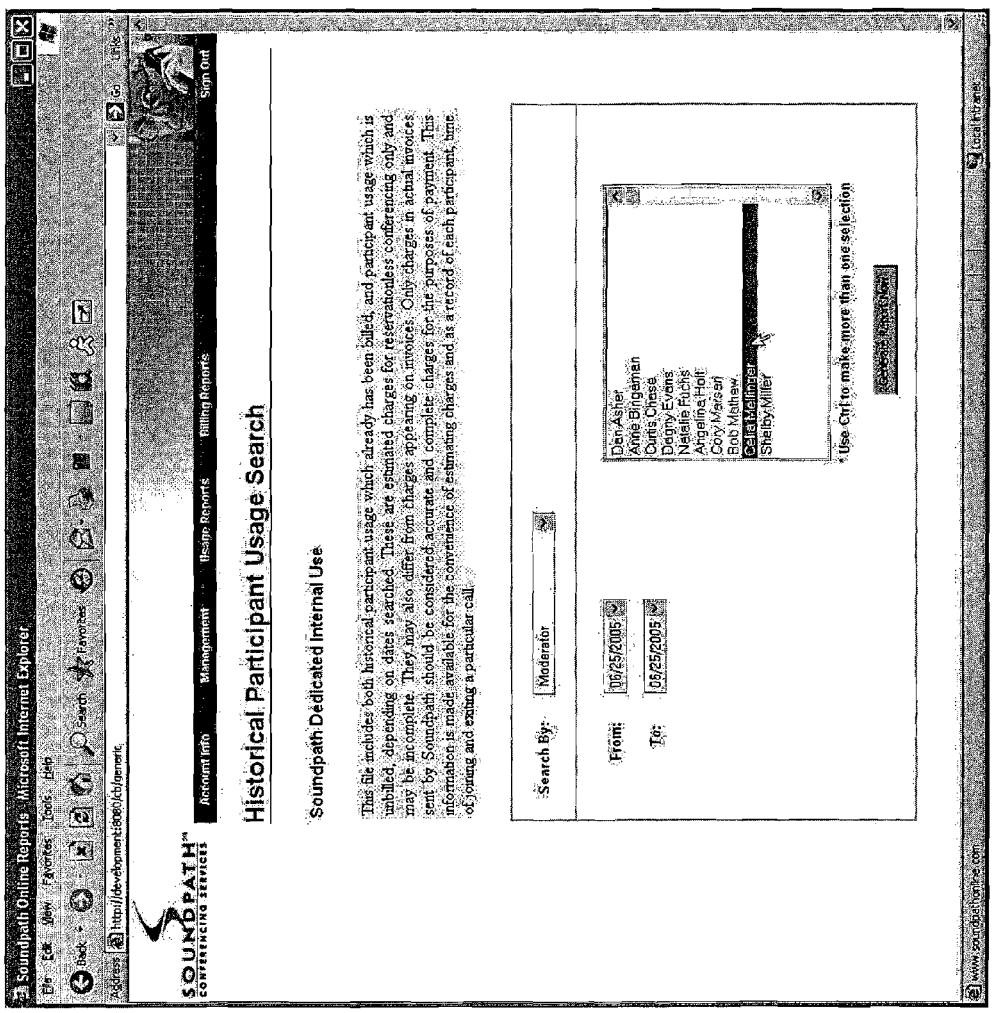
FIG. 16 is an exemplary user interface for searching historical participant usage data, consistent with embodiments of the present invention.

Usage reports component 112 may also provide a historical usage data tool to give customers access to usage information, including unbilled and previously billed data. FIG. 16 is an exemplary user interface for searching historical participant usage data. In some embodiments, historical participant usage data may include the same summary level call details and billing information as the unbilled usage reports, but for a broader range of dates (e.g., by including billed data). Participant level details and a participant's telephone number or IP address may be available for each conference by requesting call details. Historical usage reports may be displayed, printed from a browser window, downloaded to an Excel spreadsheet, or e-mailed to an inputted address. The reports may contain both summary and participant-level details for each call. Historical usage and participant-level unbilled usage reports, may, in some embodiments, display both participant-level data (e.g., telephone numbers) and billing information in one place.

Billing Reports Component

Figure 17:
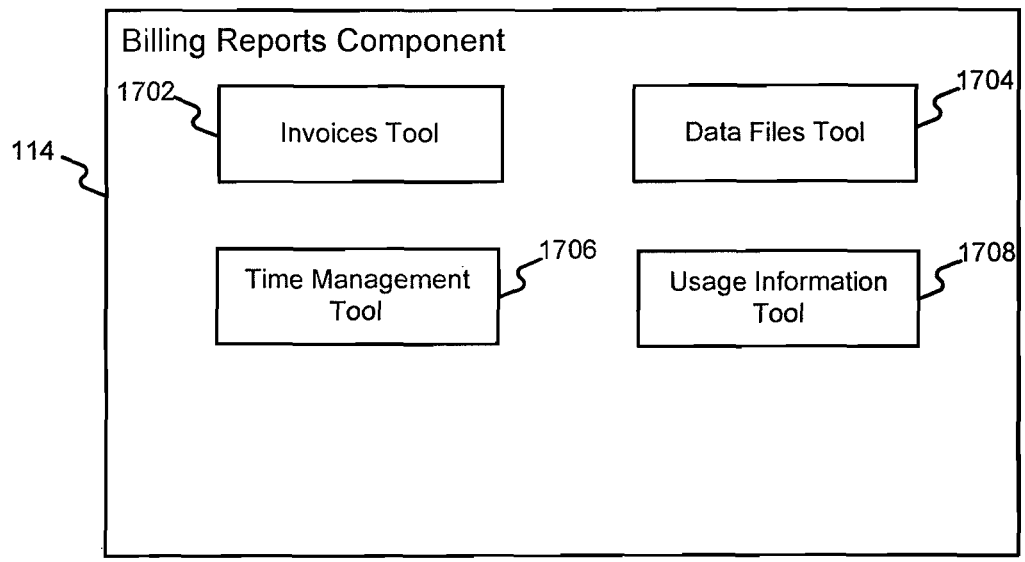
FIG. 17 is a block diagram of an exemplary billing reports component of a reporting tool, consistent with embodiments of the present invention.

FIG. 17 illustrates an exemplary billing reports component 114. Billing reports component 114 may provide customer 102 with access to billing information, for example, online in the form of invoices or data files. Unlike unbilled usage reports, which may be used for preliminary cost estimation, billing reports contain accurate and final billing costs, and may be used, for example, for accounting purposes. Billing reports may be updated after each bill run, e.g. on a monthly basis. Billing reports component 114 may include, for example, an invoices tool 1702, a data files tool 1704, a time management tool 1706, and a usage information tool 1708.

Figure 18:
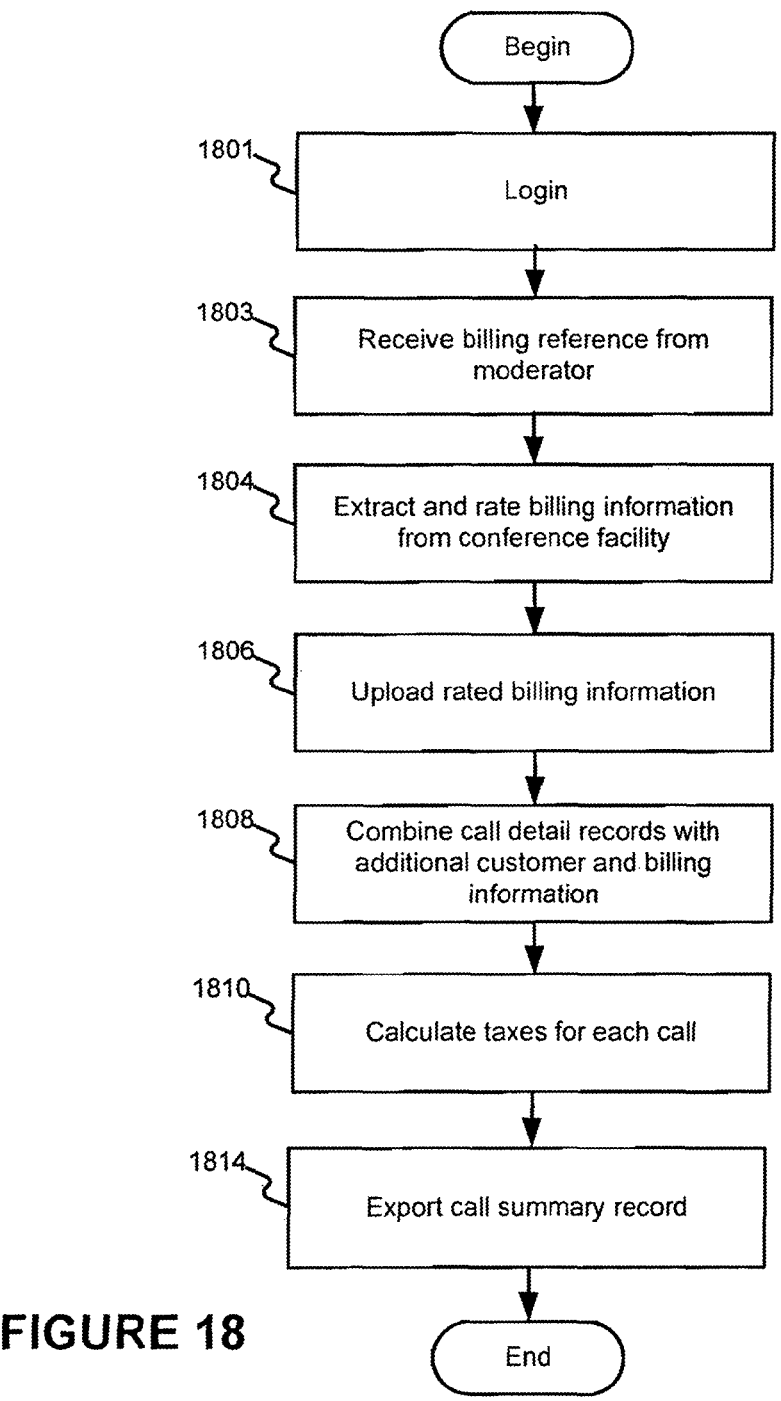
FIG. 18 is a flow diagram of an exemplary process for creating invoice data, consistent with embodiments of the present invention.

FIG. 18 is an exemplary flow diagram for creating invoice data. A moderator may login (step 1801). The moderator enters a client-matter number or other billing reference before, during or after a conference (step 1803). The billing reference, along with other conference details, is extracted from conference facilities on a periodic basis (e.g., monthly) and rated (step 1804). The rated billing information is uploaded into the conferencing services provider system for further processing (step 1806). In one embodiment, as a courtesy to its customers, the conferencing services provider may strip all one-participant calls from the call detail records so that no charges are applied for those calls. For example, these calls may illustrate that moderators are familiarizing themselves with the conferencing service prior to an actual conference.

Next, the call detail records are combined with additional customer and billing information, such as office codes, employee codes, parent billing information (e.g., in cases where conferences for multiple offices are being billed to a single location), prior payments, credits, write-offs, etc. (step 1808). Once the billing and account balance information is compiled, the system calculates the appropriate federal and state taxes for each conference (step 1810).

The primary usage-based charges associated with each call detail record and any ancillary charges (such as transcription or recording fees) are consolidated and summarized into a call summary record (step 1812). The conferencing services provider may create a file including the call summary record, such as a pipe-delimited text file, which may be uploaded into billing reports component 114 or exported (step 1814). Additional details regarding the collection and processing of invoice data may be found in U.S. patent application Ser. No. 10/848,181, entitled Dynamic Reporting Tool for Conferencing Customers.

Customers may use billing reports component 114 to query historical billing information, for example, using data from prior invoices, or searching by invoice date, office code, moderator name, employee code, billing code, etc. Invoice data may be displayed to customer 102, for example via the Internet, and the data may be downloaded to an Excel spreadsheet, printed from the browser window, or emailed to a user-specified email address, for example.

In one embodiment, billing reports component 114 includes an invoices tool that enables a user to search invoice data using search criteria. In certain embodiments, the search criteria may be based on a hierarchy of offices, moderators, and billing codes for a given customer. A moderator may be identified, for example, by employee code, and may belong to a single office and work on multiple billing code projects. Similarly, many moderators may work on a single billing code matter. Furthermore, moderators from multiple offices may work on the same billing code matter.

Figure 19:
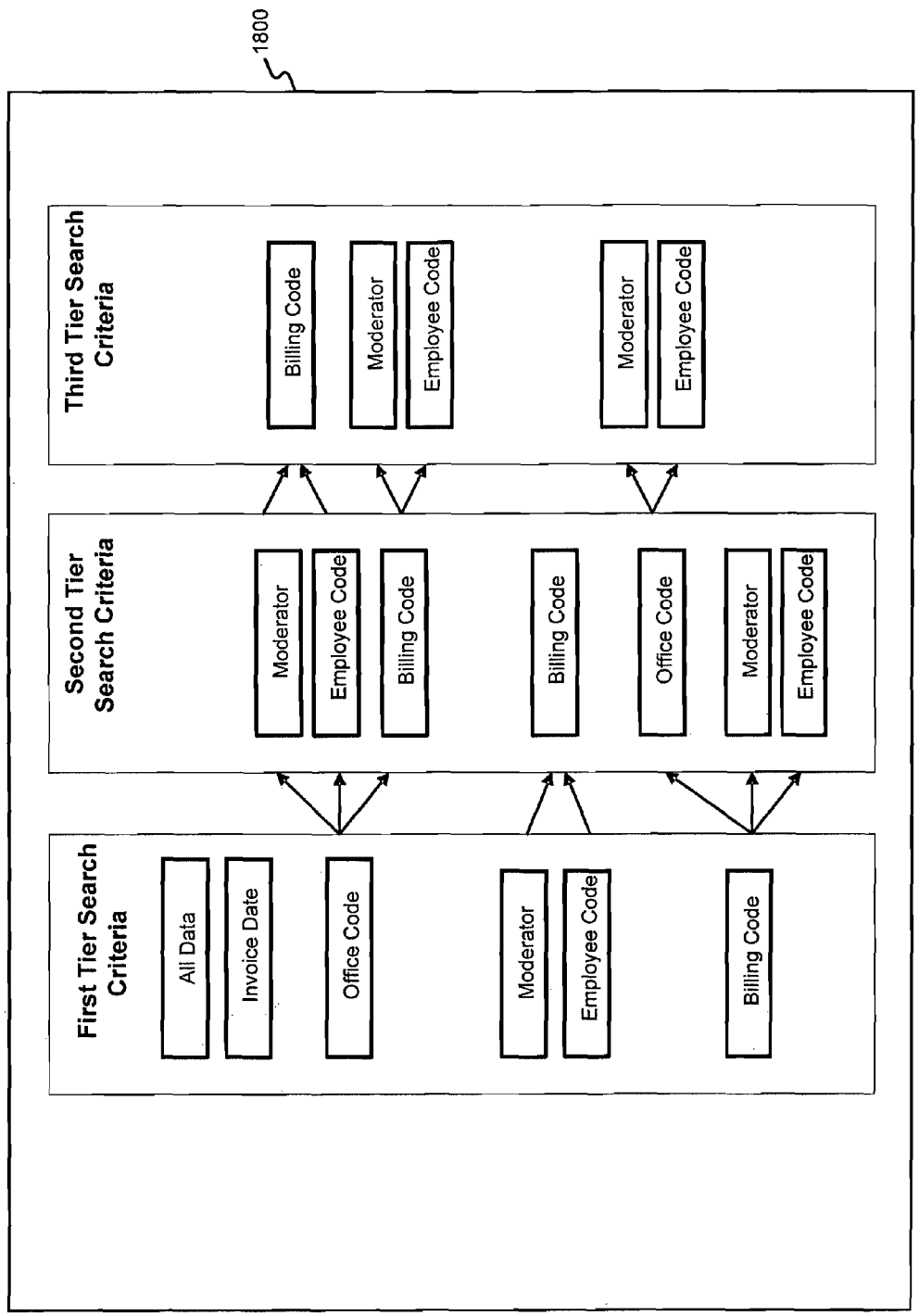
FIG. 19 is a diagram of exemplary invoice report search criteria, consistent with embodiments of the present invention.

FIG. 19 is a diagram of exemplary invoice report search criteria 1800. In the embodiment shown in FIG. 19, a user may use the "First Tier Search Criteria" to narrow a search, for example by a billing code. The user may choose to filter the search results, using "Second Tier Search Criteria," for example based on office code, moderator name, and employee code. The user may then further filter the invoice data using "Third Tier Search Criteria," for example, by moderator name and employee code.

In one example, if moderator name or employee code is selected, then the user may narrow the search further by billing code. Other types of nested or tiered searches may also be used to find invoice data. For example, a search begun with billing code may subsequently be narrowed by office code, moderator name or employee code and if the second search criterion were office code, then moderator name or employee code would finally filter the search. If the second search criterion were moderator name or employee code, there may be no other search criteria. In certain embodiments, the final options for searching are moderator name and employee code, which would uniquely identify a single moderator. If either of these is selected, the remaining search filter is billing code.

At each step of search criteria selection, the user may choose one or more values of the search criterion. For example, if the user selects office code, a list of office codes from that customer's invoice data will be displayed to the user. Once the user picks specific office codes, reporting tool 106 may save these choices for the remainder of the search criteria selection. At that point, if the user then narrows the search by moderator name, only the moderators for the previously selected office(s) will be displayed. This is also true if the user chooses to narrow the search by billing code—only the billing codes for moderators and offices previously selected will be displayed. This method of nested filtering applies regardless of the search criteria selected. An invoice report may be generated at any level of the search criteria filtering and displayed, printed, downloaded, or e-mailed.

Billing reports component 114 also allows users to obtain data files of invoice data, using, for example, data files tool 1704. These data files may include, for example, Comma Separated Value ("CSV") text files of billing data for each bill cycle. Data files may be updated after each bill run, for example on a monthly basis. To provide customers with increased flexibility and convenient billing system integration, data files may be downloaded directly into a customer's cost recovery or billing systems.

Time Management

Time management tool 1704 of billing reports component 114 may provide conferencing customers with access to valuable information pertaining to the amount of time each employee has spent on conferences. For example, a time management file may assist customers in maintaining accurate time records for employees, particularly employees whose time is billable to clients. The time management file may contain, for example, date, activity, begin time, end time, duration, billing code, name, employee code, office code, and moderator information. The duration may be formatted according to billing protocols of the customer (e.g., rounded to the nearest tenth of an hour).

Figure 20:
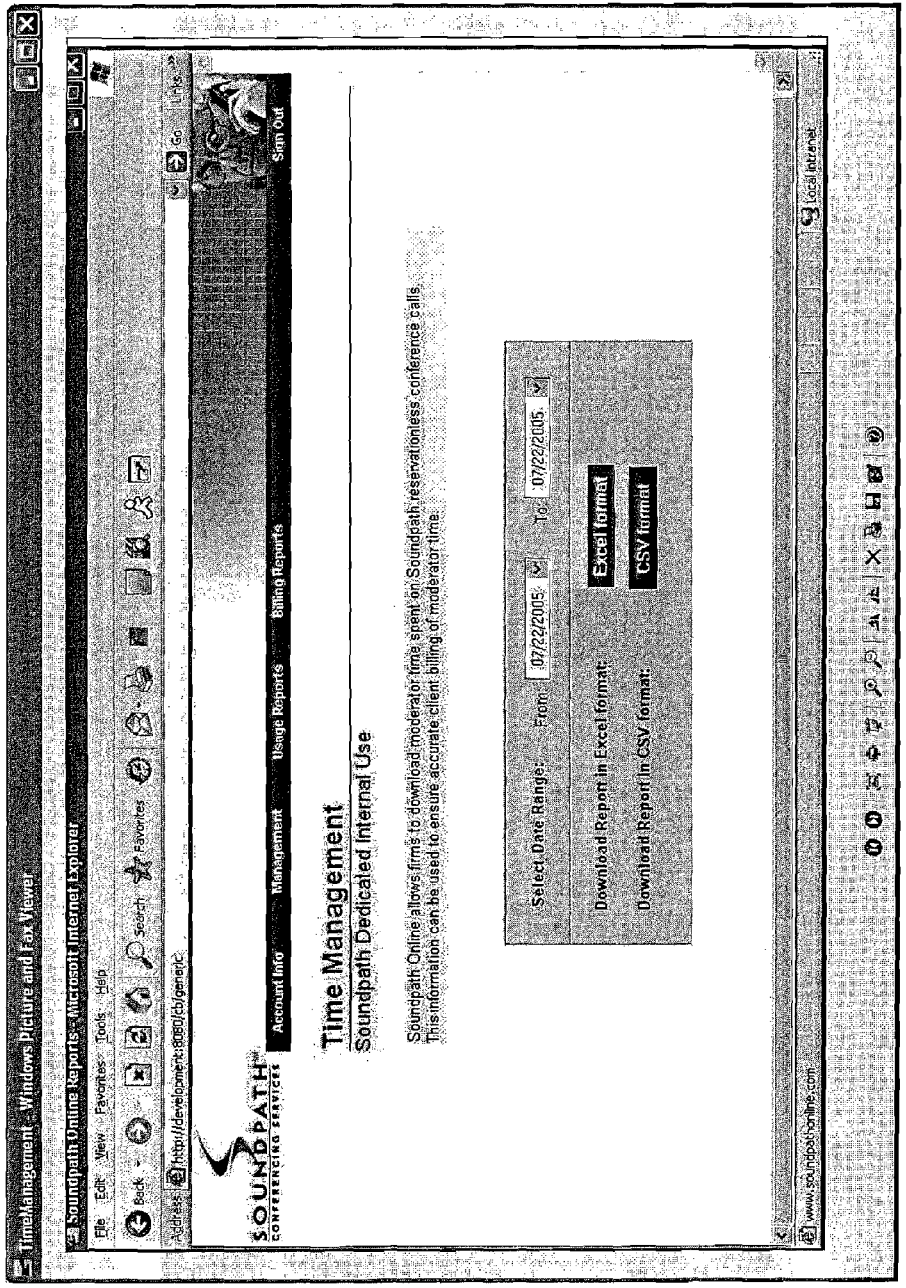
FIG. 20 is an exemplary user interface for searching time management data, consistent with embodiments of the present invention.

FIG. 20 is an exemplary user interface for searching time management data. In the embodiment illustrated in FIG. 20, a user may select a date range and specify a format for the data file, such as Excel format or CSV text files. In this way, a time management file may be downloaded and imported into internal time-keeping systems. Time management data may be updated periodically, for example, weekly, or on set dates, such as at the end of each calendar month or at the end of a customer's fiscal year.

Customers may use time management data to increase accuracy and efficiency of accounting and billing for conferencing time. For example, a moderator may participate in multiple conferences in a single day. The moderator may record only general information about his participation in the conferences or may inadvertently forget to record one of the conferences. This could result in the customer failing to properly bill for the moderator's time or in the moderator losing credit for time worked. Using a time management data file provided by time management tool 1706, the customer may double check the moderator's entered time and correct for any errors, thus recapturing valuable time and money. In another example, the time management data file may be used to automatically record billable time spent on a conference, relieving the moderator of the hassle of recording billing information for each conference he participates in.

As described above, embodiments consistent with the present invention provide an integrated online reporting tool for conferencing services reporting to support customer billing needs. Those skilled in the art will recognize that a system consistent with the present invention may include separate components to provide each of the system's features or one or more components may be omitted or combined.

Other embodiments of the invention will be apparent to those skilled in the art from consideration of the specification and practice of the invention disclosed herein. It is intended that the specification and embodiments be considered as exemplary only.

We claim:

1. An online reporting system for conferencing services comprising:
    at least one computer processor;
    an account information component for tracking information for a customer;
    a management component for managing one or more moderators associated with the customer;
    an interface component for receiving search criteria from the customer and for searching a usage database using the search criteria to locate usage information relating to the one or more moderators' usage of the conferencing services;
    a usage reports component for generating online reports related to the one or more moderators' usage of conferencing services, the usage reports component being configured to generate, based on the located information relating to the one or more moderators' usage of the conferencing services, (1) a usage report that includes historical details of the one or more moderators' usage of the conferencing services and (2) an unbilled usage data report that includes estimated charges incurred by the one or more moderators' usage of the conferencing services for which the customer has not been invoiced; and
    a billing reports component for providing online reports related to billed charges for conferencing services provided to the customer, the billing reports component being configured to generate, based on the located information relating to the one or more moderators' usage of the conferencing services, (3) a billed usage data report that includes final charges incurred by the one or more moderators' usage of the conferencing services to be invoiced to the customer.

2. The online reporting system of claim 1, further comprising:
    a time management component for tracking time management data when the moderators conduct conferences.

3. The online reporting system of claim 1, wherein the reports related to the moderators' usage of conferencing services are provided via one of display on a computer screen, downloading, e-mailing, or printing.

4. The online reporting system of claim 1, wherein the reports related to billed charges for conferencing services provided to the customer are provided via one of display on a computer, downloading, e-mailing, or printing.

5. The online reporting system of claim 1, wherein the online reports related to the moderators' usage of conferencing services include unbilled usage data.

* * * * *